DANN & McKIBBEN.
Harrow and Roller.

No. 107,461.

Patented Sept. 20, 1870.

United States Patent Office.

FRANK A. DANN AND JAMES McKIBBEN, OF WELLSVILLE, MISSOURI.

Letters Patent No. 107,461, dated September 20, 1870.

IMPROVEMENT IN COMBINED HARROWS AND ROLLERS.

The Schedule referred to in these Letters Patent and making part of the same.

We, FRANK A. DANN and JAMES McKIBBEN, of Wellsville, in the county of Montgomery and State of Missouri, have invented a new and useful Combined Harrow and Roller, of which the following is a specification.

Nature and Objects of the Invention.

Our invention consists of a roller whose surface consists of a series of projecting bands or raised portions, which are furnished with spikes, the depressions between the bands being occupied by bars furnished with harrow-teeth.

Description of the Accompanying Drawing.

Figure 1:
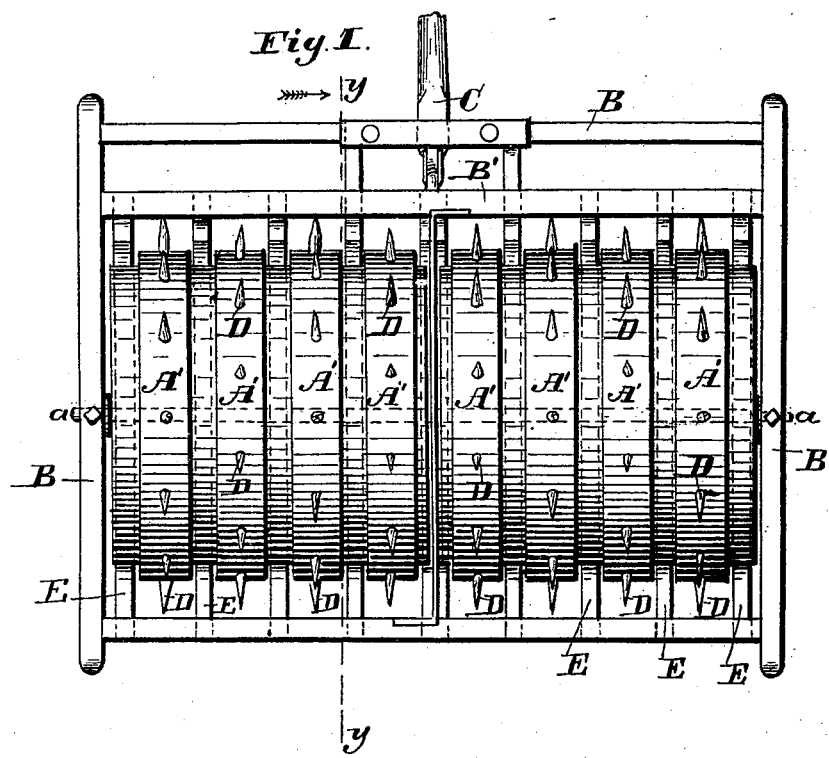
Figure 2:
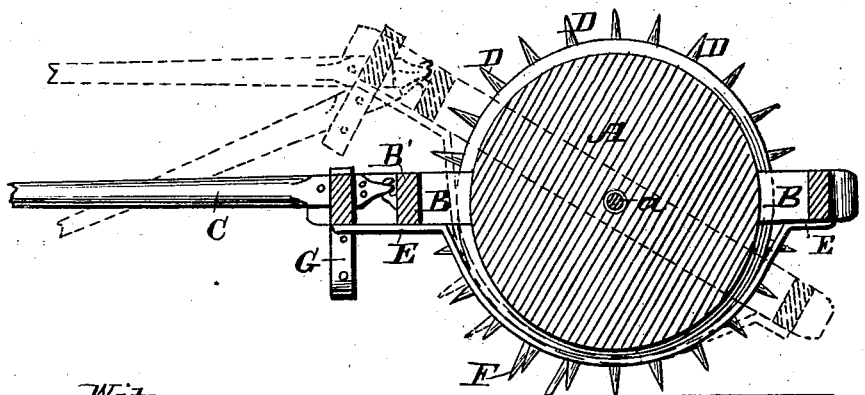

Figure 1 is a top view of the implement.
Figure 2 is a vertical transverse section at the line y y, fig. 1, the dotted lines showing the position of the frame and harrow-bars when the implement is adapted for moving to and from its work.

General Description.

A is the body of the roller, having on its periphery a series of circular belts or projecting portions, A' A', which, in the drawing, are shown as eight in number, but may be of any desirable number and width.

This roller has gudgeons $a$ $a$ in the frame B, which has a tongue, C, to which the draft-team is hitched.

Projecting from the land surfaces A' A', &c., of the roller are spikes or teeth D, whose function is to penetrate and break the clods.

E E are iron bars, attached at their ends beneath the frame B B', and having teeth F, which act as harrow-teeth upon the soil over which the implement is drawn.

The machine performs the functions:

First, of a roller, as its periphery rest upon the soil, crushing the clods and leveling the surface by pressure.

Second, of a clod-crusher, as the spikes D on the roller penetrate the clods.

Third, of a harrow, as the teeth on the bars E are dragged over the surface of the soil.

On the forward transverse bar of the frame B is a strap, G, which forms a guide for the tongue when the frame is tilted into the position shown in dotted lines in fig. 2, in which condition the teeth F F are removed from contact with the ground. A pin through the strap, or the tongue C and strap G, holds the frame in this position.

Claim.

What we claim as new is—

The combined harrow and roller, constructed substantially as described, having spiked belts A' A', and intervening harrow-teeth bars E, attached to a tilting frame.

FRANK A. DANN.
JAMES McKIBBEN.

Witnesses:
S. M. BARKER,
J. M. BARKER.